UNITED STATES PATENT OFFICE.

HERMANN ÜLSMANN, OF KÖNIGSHÜTTE, PRUSSIA, GERMANY, ASSIGNOR TO EDWARD COOPER, OF NEW YORK, N. Y.

FIRE-BRICK AND FIRE-PROOF LINING FOR FURNACES.

SPECIFICATION forming part of Letters Patent No. 252,278, dated January 10, 1882.

Application filed November 15, 1881. (No specimens.) Patented in Germany July 25, 1880, September 29, 1880, and October 5, 1880; and in Belgium October 15, 1880.

*To all whom it may concern:*

Be it known that I, HERMANN ÜLSMANN, a citizen of the German Empire, residing at Königshütte, Kingdom of Prussia, Germany, have invented new and useful Improvements in Fire-Bricks or Fire-Proof Linings for Furnaces, of which the following is a specification.

This invention relates to improvements in that class of fire-proof compounds described in Letters Patent of the United States No. 222,224, dated December 2, 1879, and No. 234,737, dated November 23, 1880, and which are produced by the mixture of limestone or dolomite or magnesite and of chlorides or hydrochloric acid or of alkalies, as soda or potash.

In the manufacture and use of this basic fire-proof compound I have found that bricks or other articles made therefrom, while being burned, undergo a very objectionable change of form, due to contraction by the escape of carbonic acid; and, furthermore, during the operation of mixing burned lime and magnesia the formation of hydrates of calcium and of magnesium takes place, which also is detrimental to the density and hardness of the burned articles formed of the compound.

The object of this invention is to overcome the disadvantages named and to produce basic bricks or other articles which, after having been burned, shall possess the greatest possible density and hardness, thus offering the requisite resistance in metallurgical processes.

For this purpose I can use with advantage a fundamental mass of burned limestone or dolomite, and also magnesite or artificially-formed magnesia.

In order to effect at once in the operation of burning the fundamental mass a strong contraction and great density, the burnt limestone or dolomite or the substance containing magnesia is mixed with a hydrated solution of the chloride—such as chloride of calcium or chloride of magnesium—named in the Patent No. 222,224, or of the alkalies—such as potash or soda—named in the Patent No. 234,737, into a plastic mass, then formed in suitable pieces, and finally well burned. During this process the carbonic acid escapes and a strongly-contracted fritted mass is obtained, which is again comminuted, and forms a product similar to that of burnt fire-proof clay (chamotte) used for the manufacture of fire-brick. In order to avoid the formation of hydrates, this basic chamotte mass is mixed with boiled tar free from water, in the proportion of about two to eight per cent., by weight, of tar, the plastic mass thus obtained being adapted to be molded into bricks or to be used directly for the formation of fire-proof linings in metallurgical apparatus. Before being molded the plastic mass may be heated, and in molding it may be strongly pressed. For the purpose of effecting a perfect adhesion it is desirable to add to the tar about three per cent., by weight, of the chloride—such as chloride of calcium or chloride of magnesium—or of the alkalies above named. In the process of burning the bricks or fire-proof linings the tar is completely consumed, so that the mass assumes a light color or is colored only by impurities of metallic oxides.

For the fundamental mass there may be used, as hereinbefore intimated, first, lime, such as limestone, marble, chalk, &c.; second, magnesia produced artificially from magnesite or by any other means; third, any suitable mixture of lime and magnesia, such as dolomite.

I disclaim distinctly all the matter described in English Patent No. 131 of 1879.

What I claim as new, and desire to secure by Letters Patent, is—

As a new article of manufacture, basic fire-brick or fire-proof lining free from carbonic acid and water, produced by mixing limestone, dolomite, or magnesia with a binding material—such as chlorides or alkalies—then burning the mixture, then comminuting the same, then mixing it with tar, and finally reburning the mixture, substantially as herein described, or by any other means adapted to produce a like result.

In testimony whereof I have hereunto set my hand and seal in the presence of two subscribing witnesses.

HERMANN ÜLSMANN. [L. S.]

Witnesses:
ERNST ALTHAUS,
RICHARD ALTHAUS.